United States Patent
Wesler

[19]

[11] Patent Number: 5,850,389
[45] Date of Patent: Dec. 15, 1998

[54] HIGH SPEED CIRCULAR DATA BUS SYSTEM

[75] Inventor: Gary B. Wesler, Hermosa Beach, Calif.

[73] Assignee: Hughes Electronics Corporation, Los Angeles, Calif.

[21] Appl. No.: 714,720

[22] Filed: Sep. 16, 1996

[51] Int. Cl.⁶ .................................................. H04B 7/185
[52] U.S. Cl. ........................... 370/325; 370/390; 370/424
[58] Field of Search ..................................... 370/312, 316, 370/318, 319, 321, 323–325, 362–363, 428, 315, 390, 392, 403, 423, 424, 429; 455/427, 428

[56] References Cited

U.S. PATENT DOCUMENTS

| 4,456,988 | 6/1984 | Nakagome et al. | 370/323 |
|---|---|---|---|
| 4,926,422 | 5/1990 | Alaria et al. | 370/325 |
| 5,050,164 | 9/1991 | Chao | 359/135 |
| 5,285,445 | 2/1994 | Lehnert et al. | 370/413 |
| 5,331,632 | 7/1994 | Aaron et al. | 370/376 |
| 5,398,241 | 3/1995 | Witchey | 370/391 |
| 5,425,022 | 6/1995 | Clark et al. | 370/360 |
| 5,497,363 | 3/1996 | Gingell | 370/376 |

*Primary Examiner*—Min Jung
*Attorney, Agent, or Firm*—Terje Gudmestad; Georgann S. Grunebach; Michael W. Sales

[57] ABSTRACT

A high speed circular data bus system having a plurality of input buffers connected to uplink demodulator units associated with a plurality of data receivers. The input buffers are connected to each other in a daisy chain configuration with each input buffer connected to the next sequential input buffer in the daisy chain configuration and connected to an associated output buffer slice. Data received from each uplink demodulator unit is sequentially circulated through each input buffer so that each input buffer sequentially sees the data received from each uplink demodulator unit. In the preferred embodiment, each input buffers consists of an input buffer node having a primary input buffer and an associated redundant input buffer. Each pair of input buffers also being connected in a daisy chain circular configuration and cross-linked to each other.

10 Claims, 6 Drawing Sheets

HIGH SPEED CIRCULAR DATA BUS SYSTEM

TECHNICAL FIELD

The invention is related to high speed data bus systems and, in particular, to a high speed circular data bus system for a communication satellite.

BACKGROUND ART

The weight, space and power requirements of the electronics for spacecraft applications is of primary importance. In many of these space applications, such as communication satellites, large amounts of data need to be transferred from multiple inputs to multiple outputs. The inputs may be asynchronous transmissions from various locations on the surface of the earth and multiple outputs may be retransmitted back to earth or another spacecraft. Current systems for routing the large amounts of data are relatively complex and require an excessive amount of electrical power. The invention is a low power, low chip count, lightweight bus system for routing large amounts of data from multiple asynchronous inputs to multiple outputs specially designed for spacecraft applications.

DISCLOSURE OF THE INVENTION

The high speed circular data bus system receives data via data receivers and retransmits the data via data transmitters. The bus system has a plurality of input buffers connected in a daisy chain circular electrical configuration. Each input buffer is adapted to receive input data asynchronously with respect to one another from demodulator units associated with the data receivers. The plurality of input buffers are operative to transfer the received data to the next sequential input buffer in a predetermined order until the data received by each input buffer is circulated to each other input buffer. The bus system also includes a plurality of output buffer slices. Each output buffer slice is associated with and connected to a respective one of the input buffers for receiving the data of its associated input buffer as the associated input buffer is transferring the data to the next sequential input buffer. Each output buffer slice has at least one individual output buffer. Each output buffer selectively transferring the data received from its associated input buffer to a modulator unit associated with the data transmitters.

In a preferred environment of the bus system, the data receivers are the data receivers of a satellite communication system having receiving antennae and amplifiers providing received data to demodulator units and the data transmitters include amplifiers and transmitting antennas receiving data from modulator units. The modulator units modulate the data received from an associated output buffer for retransmission by the data transmitters. The preferred embodiment of the bus system has a set of input buffers and a corresponding set of output buffer slices. The input buffers are connected in a circular configuration and are interconnected to each other so as to present the data received by each input buffer to all of the output buffers.

The object of the invention is a low power lightweight bus system for routing large amounts of input data from a plurality of inputs to a plurality of outputs.

Another object of the invention is to circulate the data received from the demodulator units through a plurality of input buffers so that each input buffer sees the input data from each of the demodulator units.

Another object of the invention is to connect the input buffers in a daisy chain circular configuration so that the input data is transferred from one input buffer to another in a predetermined sequence.

Still another object of the invention is to provide a redundant circular data bus system in which each input buffer consists of a primary buffer and a redundant buffer. The primary and redundant buffers being connected in a daisy chain circular configuration and interconnected with each other.

Still another object of the invention is that each input buffer is connected to an associated output buffer slice consisting of a plurality of individual output buffers and each output buffer is capable of identifying the input data it is to receive.

Yet another object of the invention is a circular data bus having a processing rate in excess of 6 Gbps while consuming under 140 watts of power.

Yet another object of the invention is to store data in the first in-first out buffers of the output buffers.

The objects of the invention set forth above and other objects may be determined from a reading of the specification in conjunction with the drawings.

BEST MODE FOR CARRYING OUT THE INVENTION

Figure 1:
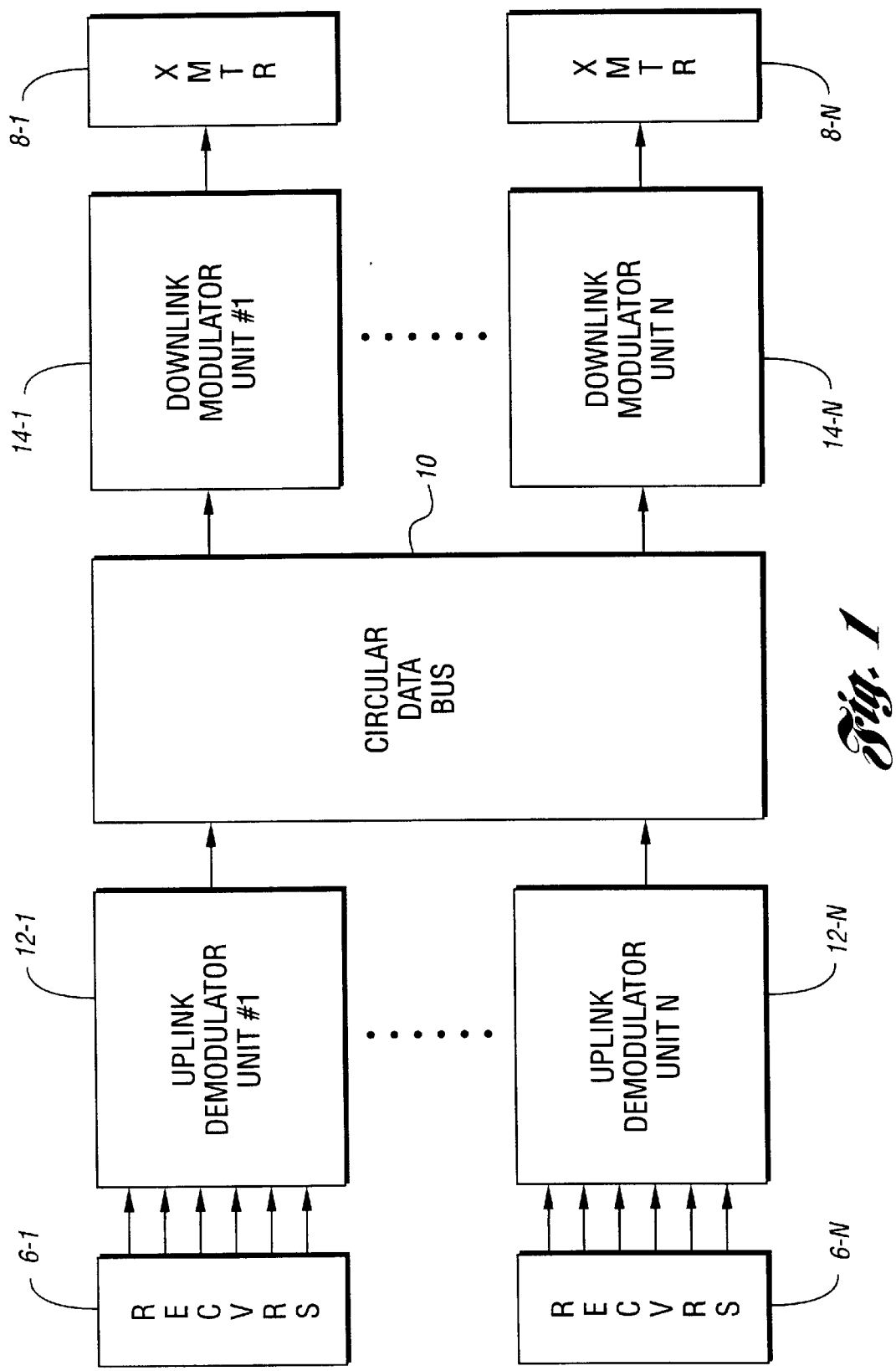
FIG. 1 is a block diagram showing the environment of the bus system.

FIG. 1 shows the high speed clocked circular data bus system 10 in a communication satellite environment having a plurality of uplink demodulators 12-1 through 12-N and a plurality of downlink modulators 14-1 through 14-N. The data received by the uplink demodulators 12-1 through 12-N are from data transmissions originating from various places on the earth surface or from another satellite or spacecraft. The data transmissions to the communication satellite are received by RF receivers which are demodulated by the demodulator units 12 in a conventional manner. In the example shown, each uplink demodulator unit 12 is capable of receiving data from six different RF receivers collectively shown on FIG. 1 as receivers 6. As is known in the art, the data transmissions may be transmitted at different frequencies or transmitted at the same frequency and different polarizations. The data demodulated by the demodulator units 12-1 through 12-N is routed via a high speed circular data bus 10 to one or more of the downlink modulator units 14-1 through 14-N. The modulator units 14-1 through 14-N will modulate the data received from data bus 10 and route the modulated data to one or more transmitters 8 which retransmit the modulated data back to earth or any other desired location.

Typical of such communication satellites as those used to relay to and from earth computer data, video conferences and commercial data such as point of sale, credit card transactions, as well as television and radio signals.

The object of the circular data bus 10 is to route the data from any one of the demodulator units 12 to any one of downlink modulators 14.

Figure 2:
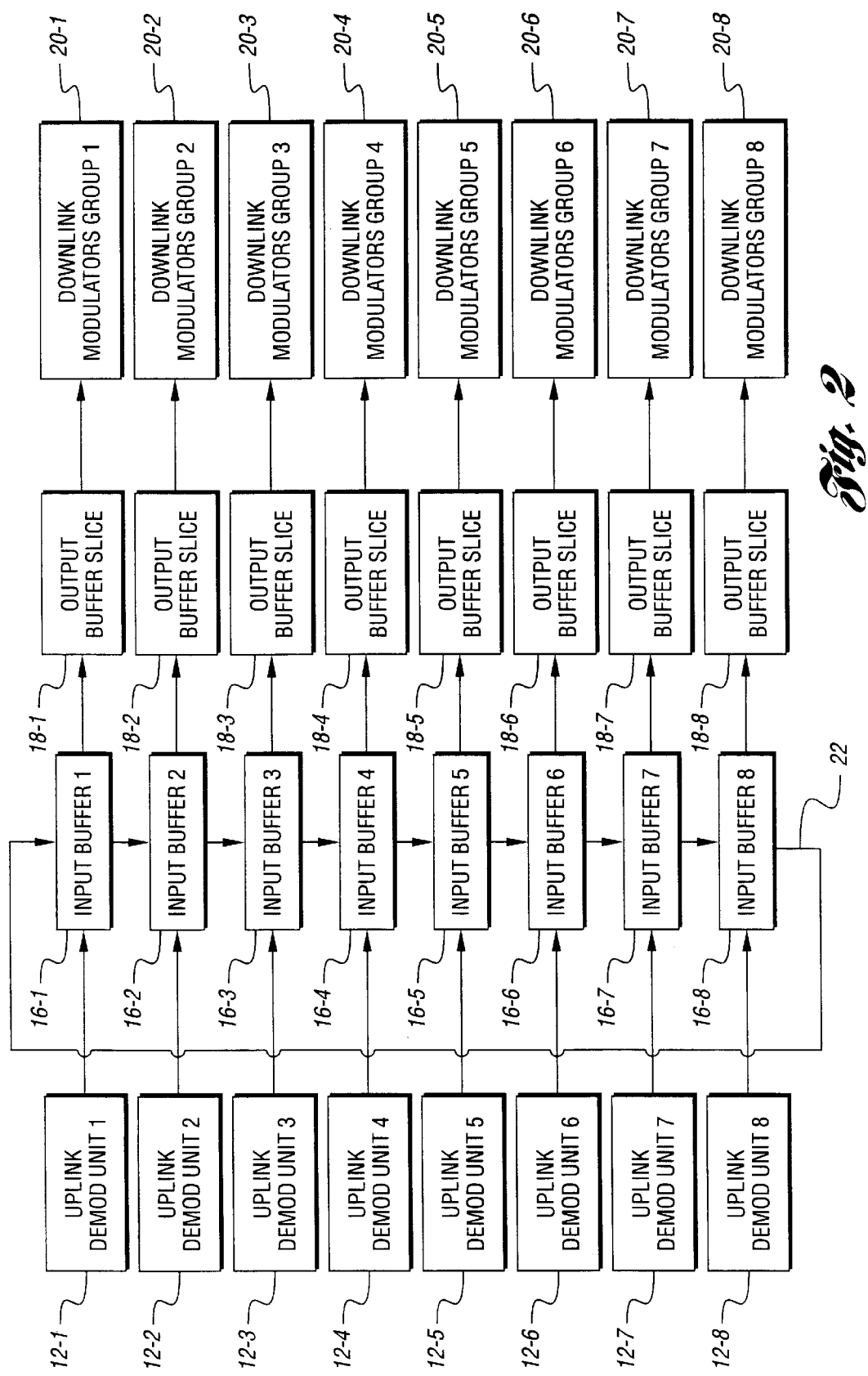
FIG. 2 is a block diagram showing the details of a simple embodiment of the data bus system.

FIG. 2 shows a simplified embodiment of the circular data bus system 10. In this embodiment, each uplink demodulator unit 12-1 through 12-8 is connected to a corresponding input buffer 16-1 through 16-8 respectively. Each input buffer 16-1 through 16-8 is connected to the input of an associated output buffer slice 18-1 through 18-8. The output of each input buffer is also connected to the input of the next lower ranked input buffer in a daisy chain circular arrangement. For example, the data in input buffer 16-1 is presented to associated output buffer slice 18-1 and clocked into input buffer 16-2, etc. To complete the circular arrangement, the data in input buffer 16-8 is presented to output buffer slice 18-8 and clocked into input buffer 16-1 as indicated by line 22. Each input buffer 16-1 through 16-N continuously and asynchronously receives and temporarily stores the data output from its associated uplink demodulator.

Initially a controller, not shown, activates input buffer 16-1 to transmit its stored data. This data is clocked out of input buffer 16-1 and presented to the associated output buffer slice 18-1 and also clocked to input buffer 16-2. Input buffer 16-2 then presents this data to output buffer slice 18-2 and clocks it into input buffer 16-3. In this fashion, each input buffer 16-1 through 16-N receives the data initially received by input buffer 16-1 and presents it to its associated output buffer slice.

Figure 4:
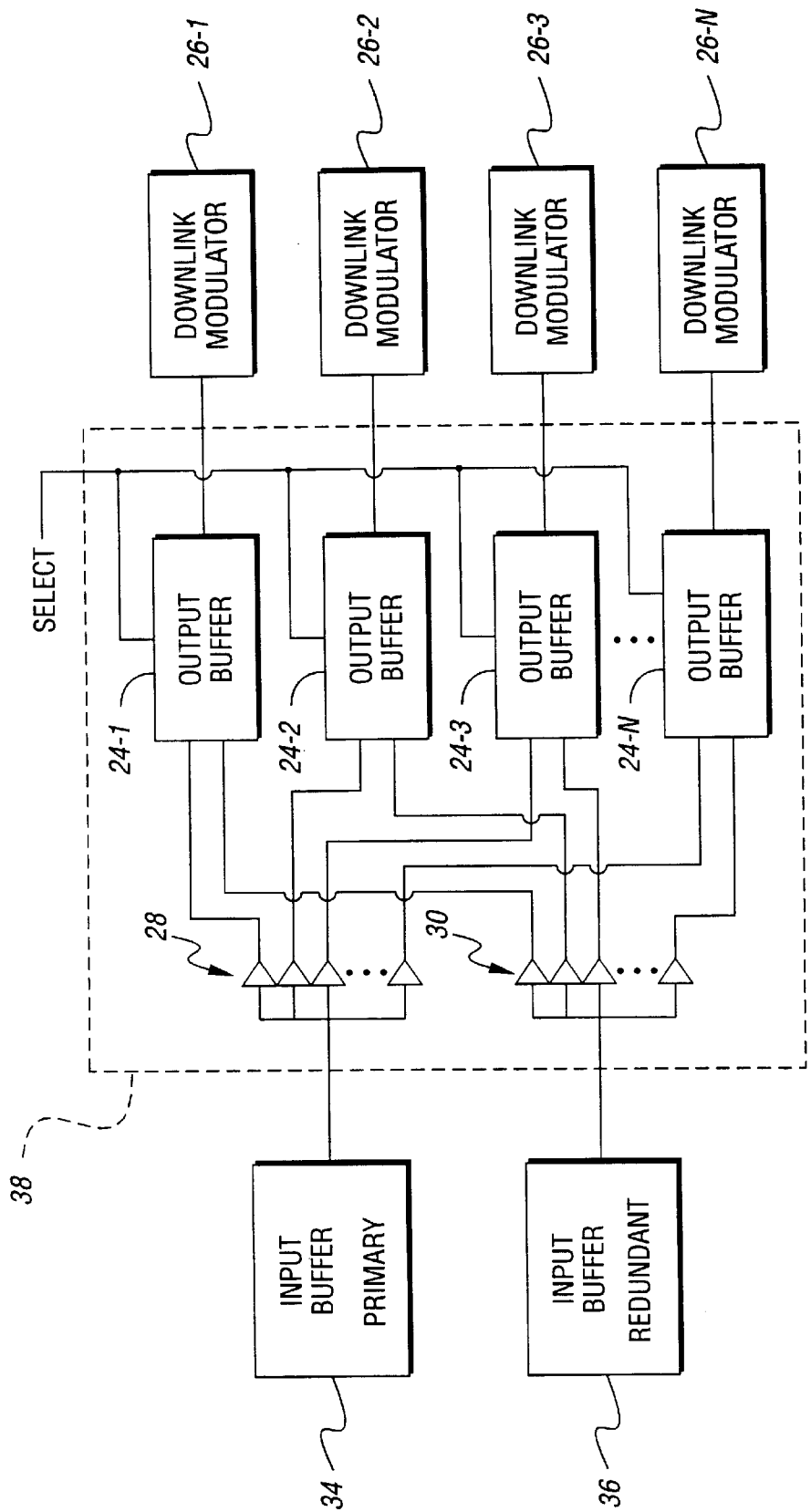
FIG. 4 is a circuit diagram of a portion of an output buffer slice.

Each output buffer slice 18-1 through 18-N consists of a plurality of output buffers 24-1 through 24-N as shown in FIG. 4. Upon being presented with the data from its associated input buffer, each output buffer 24-1 through 24-N looks at the first word of the presented data to see if it is the intended destination or one of the intended destinations of that data.

Once the initial data from uplink demodulator 12-1 has been clocked out of input buffer 16-1, the controller selects input buffer 16-2 as the data source. Input buffer 16-2 then presents its data to output buffer slice 18-2 and clocks its data to input buffer 16-3. Once again, the data from input buffer 16-2 is clocked around the circular chain to all of the other input buffers and this data is sequentially presented to each output buffer slice. The controller then selects in sequence input buffers 16-3 through 16-8 to be the data sources. The fact that the input buffers 16-1 through 16-8 are connected in a circular chain allows the sequential selection of the input buffers as the sources because the data is clocked to the next input buffer until it has arrived at the input buffer prior to the source buffer in every case.

It is to be noted that when input buffer (n) is the data source, input buffer (n+1) only need to wait for the data received from input buffer (n) to be clocked through it before it can become the next data source. In this manner, input buffer (n+1) does not have to wait until the data from input buffer (n) circulates through the entire circular chain before it is selected to be the next data source.

The data output from each of the output buffer slices 18-1 through 18-8 are received by a respective group of downlink modulators indicated as downlink modulator groups 20-1 through 20-8. Each downlink modulator 26 of each downlink modulator group 20 is being associated with a respective one of the output buffers 24-1 through 24-N in the associated output buffer slices 18-1 through 18-N as shown on FIG. 4.

The circular data bus is 56 bits wide and preferably runs at a frequency of 125 MHz. The high speed of the bus necessitates reclocking of the data at each node to prevent deterioration of the signal. In the preferred embodiment of the invention, the data consists of cells having eight (8) 56-bit words. A ninth 56-bit word is prepended to the data by the uplink demodulators 12-1 through 12-N as a bit map. Each bit of the 56-bit bit map corresponds to one of the output buffers 24-1 through 24-N of the output buffer slices 18-1 through 18-N. The bits in the bit map in excess of the number of output buffers 24-1 through 24-N are reserved for other uses such as telemetry. As previously indicated, each output buffer 24 interrogates the first word, i.e. the bit map, to determine if the bit which identifies the word as a bit map is set and also if the bit corresponding to that output buffer is set. If both are set, the output buffer 24 accepts the data in the eight word cell that follows. The bit map allows "multicasting" in that a single cell of data can be accepted by more than a single output buffer when more than one bit in the bit map is set.

The number of cells clocked out of each input buffer 16 during its time-division multiplexed slot can be predetermined. In the preferred embodiment of the circular data bus, the time-division multiplexed (TDM) slot is selected to permit two cells to be transferred from the input buffer's first-in first out (FIFO) buffer 40 shown on FIG. 5. The input data buffering capabilities of the FIFO buffers 40 of the input buffers 16 are adjusted to accommodate the faster data output rates of the uplink demodulator and therefore the input FIFO buffer 40 can store up to four data cells.

Figure 3:
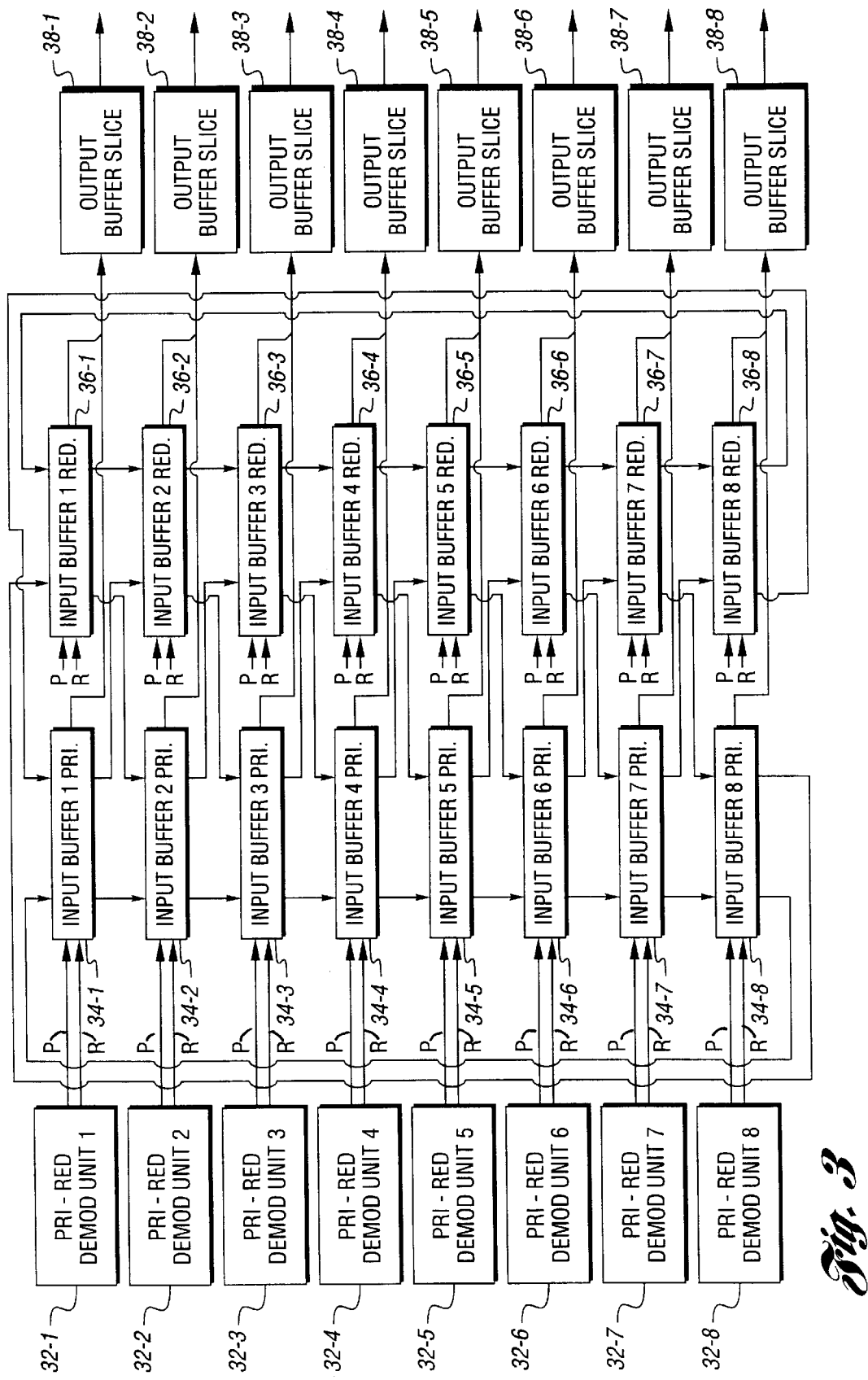
FIG. 3 is a block diagram showing the details of a redundant embodiment of the data bus system.

FIG. 3 is a block diagram of a redundant embodiment of the circular data bus system 10 of the present invention. Each input buffer of this embodiment consists of an input buffer node having a pair of input buffers. Each pair of input buffers in each node consists of a primary input buffer 34 and a redundant input buffer 36. The input buffer nodes are connected to each other in a daisy chain circular manner as described relative to FIG. 2. At any one time, the data path through the input buffer node will be through either the primary input buffer or the associated redundant input buffer, but not through both. Each primary and redundant input buffer of each input buffer node is wired to the succeeding primary and redundant input buffer. For example, primary input buffer 34-1 is connected by 56 lines to primary input buffer 34-2 and cross wired by 56 lines to redundant input buffer 36-2. In a like manner, redundant input buffer 36-1 is connected by 56 lines to redundant input buffer 36-2 and cross wired to primary input buffer 34-2. With this arrangement, one of the primary or redundant input buffers of any input buffer node can become disabled without affecting the redundancy of either the preceding or succeeding input buffer node.

The uplink primary/redundant demodulator units 32-1 through 32-8 produce demodulated primary and redundant data, on two separate lines, which are continuously and asynchronously transmitted to a selected one of the primary or redundant input buffers of the associated input buffer node where it is temporarily stored.

The data content of primary or redundant input buffers (34, 36) of each input buffer node is presented to an associated output buffer slice 38 as shown on FIG. 3. For example, primary input buffer 34-1 and redundant input buffer 36-1 are connected to output buffer slice 38-1 while primary input buffer 34-2 and redundant input buffer 36-2 are connected to output buffer slice 38-2, etc.

Although the embodiment shown in FIG. 3 has eight input buffer nodes (34, 36) and eight output buffer slices 38, those skilled in the art will recognize that the circular data bus system 10 may have more or less than eight input buffer nodes and output buffer slices.

The primary input buffers 34 and the redundant input buffers 36 of each input buffer node are crosslinked to preceding and succeeding input buffer nodes, as shown, so that the data may be transferred from the primary input buffers in a first input buffer node to the redundant input buffer in a succeeding input buffer node and vice versa in response to an externally generated select signal.

An example of an output buffer slice 38 is shown on FIG. 4. The output buffer slice 38 has a plurality of output buffers 24-1 through 24-N, a plurality of primary buffer amplifiers 28, and a plurality of redundant buffer amplifiers 30. Although the illustrated output buffer slice has only four output buffers, each output buffer slice 38 may have more or less individual output buffers than the four illustrated.

The data clocked to primary input buffer 34 is presented to all of the output buffers 24-1 through 24-N through an associated primary buffer amplifier 28, respectively. In the alternative, if the primary input buffer 34 is inactive and the redundant input buffer 36 is active, the data stored in the redundant input buffer 36 is presented to the output buffers 24-1 through 24-N through redundant buffer amplifiers 30. The externally generated select signal determines whether the data from the primary input buffer 34 or the data from the redundant input buffer 36 is clocked into the output buffers 24-1 through 24-N.

Each of the output buffers 24-1 through 24-N is connected to an associated downlink modulator 26-1 through 26-N, respectively. The output buffer slices 38 are capable of transferring the data received by the primary or redundant input buffer to the appropriate downlink modulator for retransmission.

Figures 5, 6:
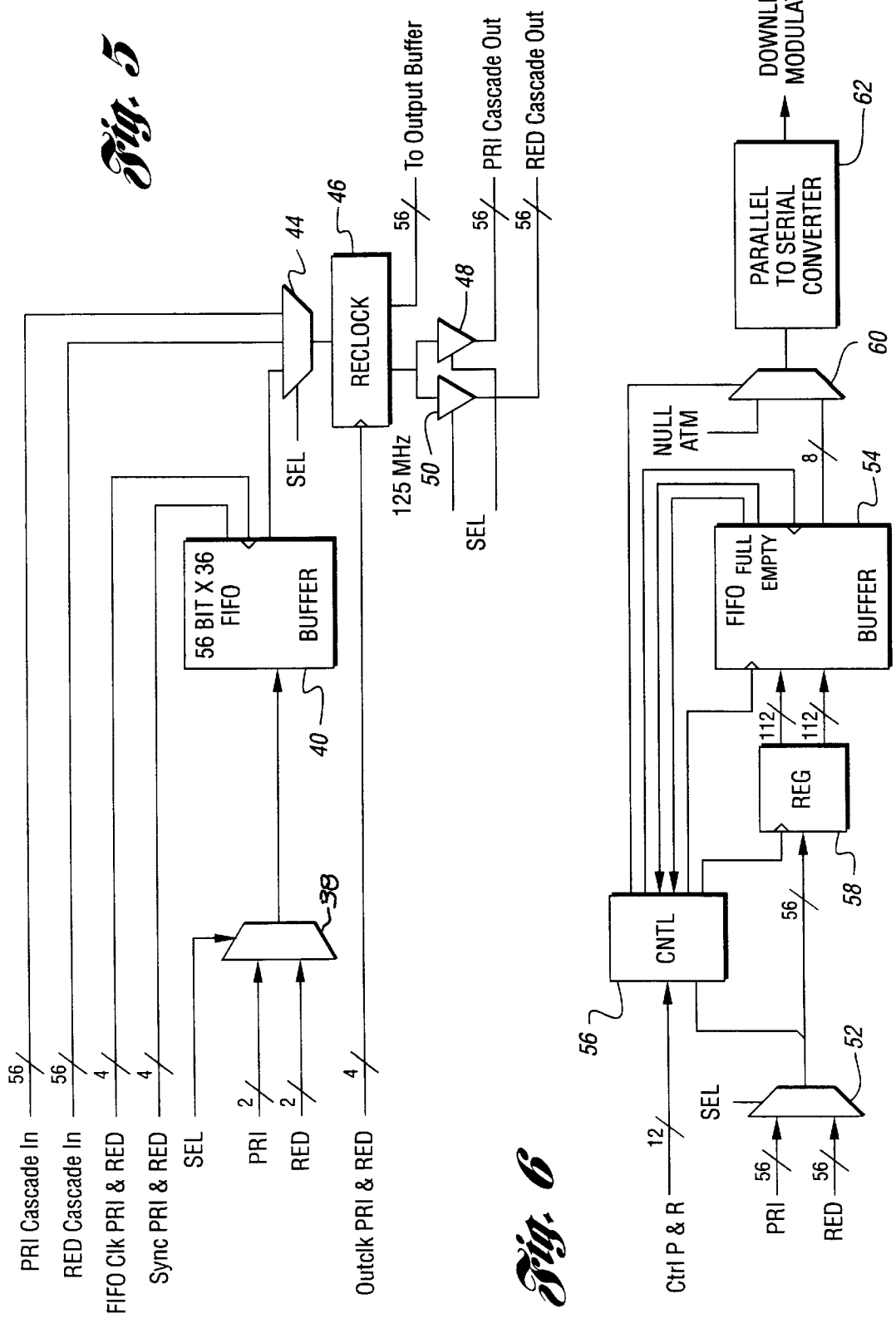
FIG. 5 is a circuit diagram of an input buffer according to the invention.
FIG. 6 is a block diagram showing the generation of the clock and sync signals.

The details of the primary input buffers 34 are shown on FIG. 5. The details of the redundant input buffers 36-1 through 36-8 are the same as the primary input buffer 34 shown in FIG. 5 and therefore need not be shown or discussed in detail for an understanding of the invention. The primary or the redundant data from the associated primary or redundant demodulator unit 32 is transferred to and stored in a first-in, first-out (FIFO) buffer 40 through a multiplexer 42. The multiplexer will transfer either the primary or redundant data to the buffer 40 in accordance with the select signal. The data stored in the buffer 40 is transferred to a multiplexer 44. The multiplexer 44 also receives primary and redundant cascaded data from a preceding input buffer as described relative to FIG. 3. The data received from the buffer 40 or the cascaded primary or redundant data is transferred to a reclock module 46 where it is reclocked to prevent deterioration of the data. After the data is reclocked, it is presented to the associated output buffer slice 38 and transmitted to either the next primary input buffer 34 or the next redundant input buffer 36. The data transmitted to the next primary and redundant input buffer is identified as Primary Cascade Out and Redundant Cascade Out on FIG. 5. This data is transferred through amplifiers 48 and 50 respectively controlled by the select signal.

The details of each output buffer 24-1 through 24-N are shown in FIG. 6. The data from the primary or redundant input buffers 34 and 36, respectively, are received at a demultiplexer 52 via buffer amplifier 28 or 30. The demultiplexer 52 permits one or the other of the received data to be transmitted to a first in/first out (FIFO) buffer 54. Since data can be loaded into the FIFO buffer 54 at a rate faster than it can be transmitted to its associated downlink demodulator, FIFO buffer 54 has the storage capacity to store a relatively large number of data cells. In the preferred embodiment, FIFO buffer 54 has the capacity to store up to 2000 data cells. The bit map portion of the data cell is transmitted to a control 56 which determines if this data was intended to be received by this particular output buffer. If so, a register 58 and the FIFO buffer 54 are activated to receive the next eight data words of the data cell. The register 58 accumulates the received data until two 56 bit words are received and then transfers the two words in parallel to the FIFO buffer 54. Data is continuously clocked out of the FIFO buffer 54 to a parallel-to-serial converter 62.

The FIFO buffer 54 will transfer its data to the associated downlink modulator through a multiplexer 60 and the parallel-to-serial converter 62. When the buffer is empty, the multiplexer will output a null data word.

The parallel-to-serial converter converts the eight bit words clocked out of the buffer 54 to serial data.

Figure 7:
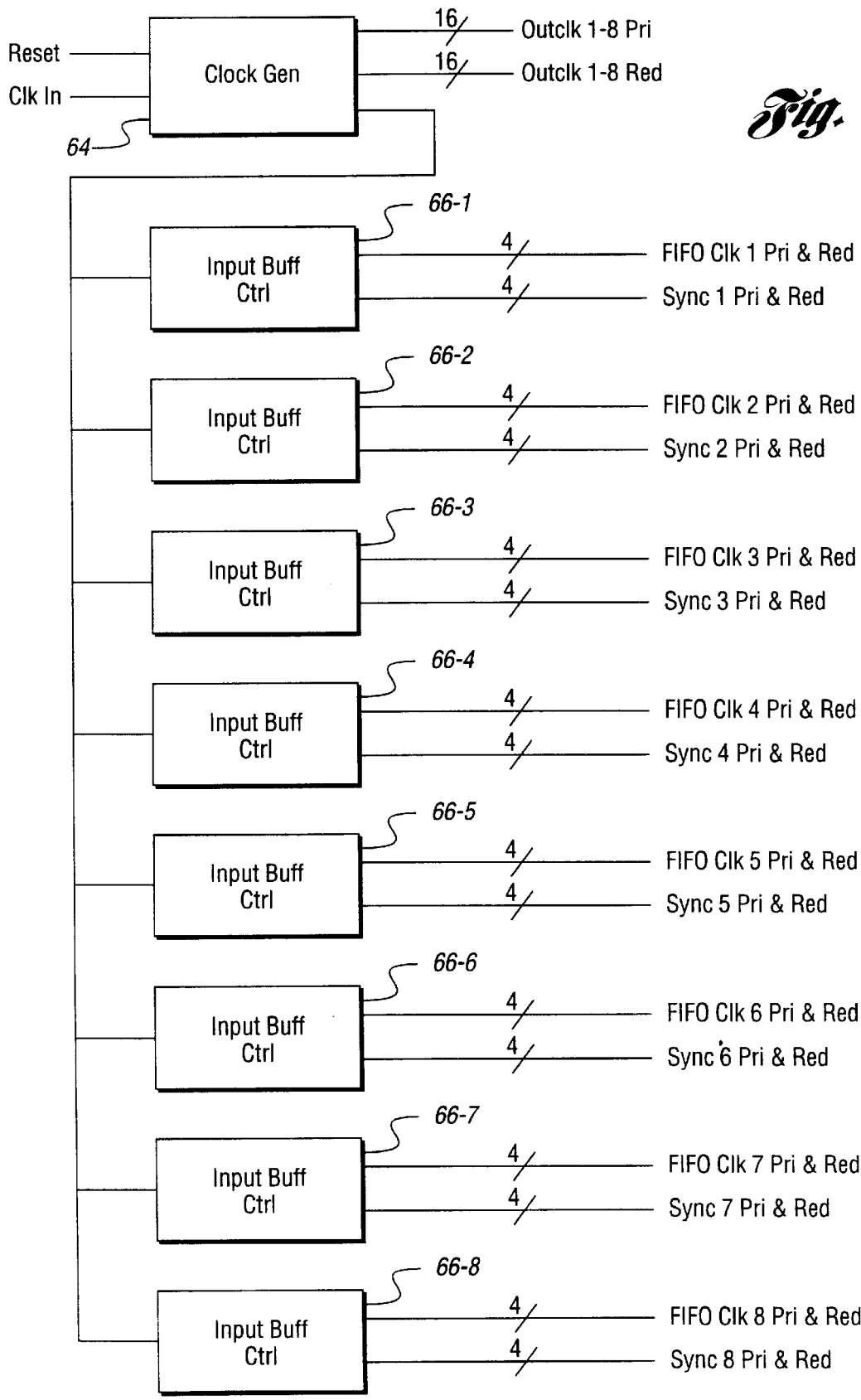
FIG. 7 is a block diagram showing the structure for generating the clock and sync signals.

FIG. 7 shows the structure for generating of the required clock and sync signals. A clock generator 64 generates the clock signals for reclocking the data such as shown in FIG. 5. The clock generator 64 also provides the clock signals for the input buffer controls 66-1 through 66-8 which generate the required buffer and sync signals for the input buffers.

Having disclosed a preferred embodiment of the invention, it is recognized that others skilled in the art may make certain changes and improvements within the scope of the invention as set forth in the appended claims.

What is claimed is:

1. A high speed circular data bus system for a communication system having a plurality of data receivers and demodulator units asynchronously generating demodulated input data and a plurality of modulator units and data transmitters transmitting modulated output data, wherein the data bus system routes data from the demodulator units to the modulator units, said data bus system comprising:

a plurality of input buffers connected to each other in a daisy chain circular configuration, each input buffer of said plurality of input buffers adapted to receive demodulated input data asynchronously with respect to one another from a respective one of said plurality of demodulator units, said plurality of input buffers are operative to transfer the data received by each input buffer of said plurality of input buffers to a next sequential input buffer in a predetermined sequence until the input data received from each demodulator unit is circulated to each input buffer of said plurality of input buffers; and a plurality of output buffer slices, each output buffer slice of said plurality of output buffer slices being associated with and connected to a respective one of said input buffers for receiving the data of its associated input buffer as the associated input buffer is transferring the data to the next sequential input buffer, each output buffer slice having at least one output buffer connected to an associated one of said data modulator units, each output buffer selectively transferring the data received from its associated input buffer to said associated modulator unit for retransmission.

2. The data bus system of claim 1 wherein each demodulator unit prepends a bit map to the input data identifying the output buffer selected to transmit the data to its associated modulator unit, said at least one output buffer includes a control responsive to said bit map to identify itself as the output buffer selected to transfer the data to its associated modulator unit for retransmission by its associated data transmitter.

3. The data bus system of claim 1 wherein each input buffer of said plurality of input buffers comprises:

a primary input buffer; and an associated redundant input buffer, said primary and redundant input buffers connected to each other in a cross-linked circular configuration such that each primary input buffer is connected to a succeeding primary and a succeeding redundant input buffer and each redundant buffer is connected to a succeeding redundant and a succeeding primary input buffer; and wherein associated ones of said primary and redundant input buffers of each input buffer are further connected to said associated output buffer slice.

4. The data bus system of claim 3 wherein said plurality of data receivers are the radio frequency (RF) receivers of a satellite communication system, and each demodulator unit is associated with a subset of said RF receivers and wherein each demodulator unit is associated with a respective one of said primary input buffers and its associated redundant input buffer, each demodulator unit communicating primary and redundant data to said associated primary input buffer and said redundant input buffer, and wherein each of said plurality of data transmitters include an associated modulator unit for modulating the data received from its associated output buffer for retransmission to a remote location.

5. The data bus system of claim 3 wherein each demodulator unit is associated with a respective one of said primary input buffers and its associated redundant input buffer and communicates primary and redundant data to said associated primary input buffer and said redundant input buffer, and wherein each of said input buffers of said plurality of input buffers comprises:

a first selector for selecting one of said primary and redundant data received from said demodulator unit for storage in response to a first externally generated select signal;

a buffer for temporarily storing said data;

a reclock module for reclocking data prior to transmission to said associated output buffer slice;

a second selector for transmitting in the alternative, the data from said buffer or the data received from a preceding input buffer to said reclock module in response to a second externally generated select signal; and an amplifier for transmitting the data from said reclock module to the next sequential input buffer of said plurality of input buffers.

6. The data bus system of claim 1 wherein each of said input buffers comprises:

a buffer for temporarily storing said data received from an associated demodulator unit;

a reclock module for reclocking received data prior to transmitting it to said associated output buffer slice;

a multiplexer for selectively transmitting in a parallel format the data stored in the buffer and data received from a preceding input buffer to said reclock module in response to an externally generated select signal; and an amplifier connected to said reclock module for transferring said reclocked data from said reclocked module to the next sequential input buffer in response to said select signal.

7. The data bus system of claim 1 wherein each of said output buffers comprises:

a FIFO buffer for storing the data received from the associated input buffer; and a selector disposed between the FIFO buffer and said associated one modulator unit to alternatively transfer said data stored in said FIFO buffer or a null signal to said associated one modulator unit in response to a select signal.

8. The data bus system of claim 7 wherein said data stored in the associated input buffer includes a bit map identifying the output buffer in which the data is to be transferred, and wherein each output buffer of said plurality of output buffers includes a control responsive to said bit map identifying itself as the output buffer in which said data is to be transferred to enable said buffer to receive said data.

9. The data bus system of claim 8 wherein said data comprises a predetermined number of data words, each output buffer further comprises:

a register for storing at least two data words received from said associated input buffer and transferring said at least two data words to said FIFO buffer in response to said control identifying itself as an output buffer in which said data is to be stored; and a parallel-to-serial converter for converting data output from said FIFO buffer to serial data for utilization by said modulator unit.

10. The data bus system of claim 3 wherein said data includes a predetermined number of data words including a prepended bit map, said output buffer comprises:

a FIFO buffer for temporarily storing said received data words;

a first selector for transferring in the alternative, the data received from said primary input buffer or said redundant input buffer to said FIFO buffer in response to said externally generated select signal;

a register disposed between said first multiplexer and said buffer to convert said data to at least two parallel words prior to being stored in said FIFO buffer;

a control responsive to said bit map to enable said register to transfer said predetermined number of data words to said buffer in response to said bit map identifying that output buffer as the output buffer in which the data is to be transferred, said control further responsive to said FIFO buffer being full to generate a transfer signal;

a parallel-to-serial converter for converting the data received from said FIFO buffer from a parallel data format to a serial data format; and a second selector disposed between said FIFO buffer and said parallel-to-serial converter responsive to said transfer signal to transfer in the alternative said data from said FIFO buffer in a parallel format to said parallel-to-serial converter or a null signal.

* * * * *